(12) United States Patent
Smith et al.

(10) Patent No.: US 8,955,391 B2
(45) Date of Patent: Feb. 17, 2015

(54) ULTRASONIC FLOW MEASUREMENT ARRANGEMENT AND METHOD HAVING A CLOCK GENERATING DEVICE AND DRIVER

(71) Applicant: ams AG, Unterpremstätten (AT)

(72) Inventors: Jeffrey Smith, Graz (AT); Stefan Sattler, Gleisdorf (AT)

(73) Assignee: ams AG, Unterpremstaetten (AT)

( * ) Notice: Subject to any disclaimer, the term of this patent is extended or adjusted under 35 U.S.C. 154(b) by 152 days.

(21) Appl. No.: 13/843,614

(22) Filed: Mar. 15, 2013

(65) Prior Publication Data

US 2013/0247685 A1 Sep. 26, 2013

Related U.S. Application Data

(60) Provisional application No. 61/614,869, filed on Mar. 23, 2012.

(30) Foreign Application Priority Data

Jul. 24, 2012 (EP) ..................................... 12177638

(51) Int. Cl.
*G01F 1/66* (2006.01)

(52) U.S. Cl.
CPC . *G01F 1/66* (2013.01); *G01F 1/667* (2013.01)
USPC ..................................................... 73/861.27

(58) Field of Classification Search
None
See application file for complete search history.

(56) References Cited

U.S. PATENT DOCUMENTS

| 3,914,999 A | 10/1975 | Grandchamp |
| 5,174,295 A | 12/1992 | Christian et al. |

FOREIGN PATENT DOCUMENTS

| GB | 2046442 A | 11/1980 |
| WO | 92/17753 A1 | 10/1992 |

OTHER PUBLICATIONS

H. Estrada, "General Principles of LEFM Time-of-Flight Ultrasonic Flow Measurement", Cameron Caldon, Feb. 2001, TP12 Rev. 4, <http://www.c-a-m.com/Forms/Resource.aspx?ResourceID=2e423654-beaf-416f-8f30-0198607fdf24>.
S. Jain, "A Survey of Laser Range Finding", Dec. 2, 2003, <http://citeseerx.ist.psu.edu/viewdoc/download?doi=10.1.1.130.6167&rep=rep1&type=pdf>.

*Primary Examiner* — Harshad R Patel
(74) *Attorney, Agent, or Firm* — McDermott Will & Emery LLP

(57) ABSTRACT

A measurement arrangement comprises a clock generator (11) which can be coupled to an emitting ultrasonic transducer (13) and a mixing arrangement (12) for providing a first mixer output signal (SO1). The mixing arrangement (12) has a first input (18) which can be coupled to a receiving ultrasonic transducer (14) and a second input (19) which is coupled to the clock generator (11).

16 Claims, 2 Drawing Sheets

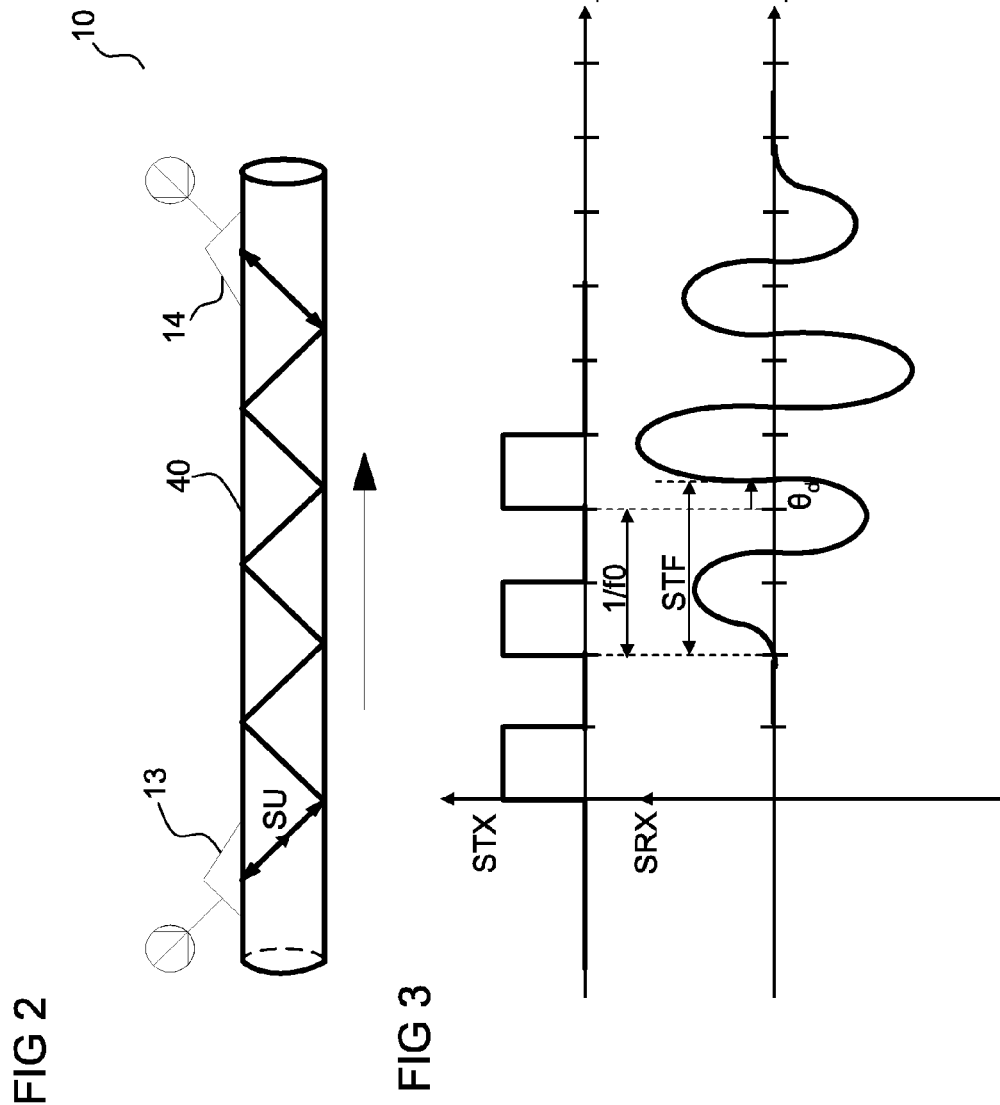

ULTRASONIC FLOW MEASUREMENT ARRANGEMENT AND METHOD HAVING A CLOCK GENERATING DEVICE AND DRIVER

The present invention relates to a measurement arrangement and a measurement method.

The measurement arrangement and method determines a flow rate of a gas or a liquid and uses two ultrasonic transducers. The flow rate measurement makes use of the change in time taken for a signal to get from an emitting ultrasonic transducer to a receiving ultrasonic transducer due to the flow.

Document "General principles of LEFM time-of-flight ultrasonic flow measurements", author Herb Estrada, 2001 describes a flow measurement system that projects acoustic energy along one or more diagonal paths through a pipe. If an upstream transducer is excited by a burst of electrical energy, it will transmit a packet or pulse of acoustic energy into the adjacent medium and a time measurement by counting pulses of a clock is initiated. The acoustic pulse will propagate in a straight line from the upstream transducer to a downstream transducer, where it will produce a small burst of electrical energy at the downstream transducer. The arrival of energy at the downstream transducer is detected and this detection causes the accumulation of clock pulses in a time counter to stop.

It is an object of the present application to provide a measurement arrangement and a measurement method which achieves a high accuracy.

This object is achieved with the subject-matter of the independent claims. Embodiments are given in the dependent claims.

In an embodiment, a measurement arrangement comprises a clock generator for generating a clock signal and a driver that is configured to generate a driver signal having a driver frequency based on the clock signal and to provide the driver signal to an emitting ultrasonic transducer. Moreover, the measurement arrangement comprises an averaging and dividing module and a mixing arrangement having a first input which can be coupled to a receiving ultrasonic transducer. A second input of the mixing arrangement is coupled to the clock generator. The mixing arrangement generates a first and a second mixer output signal.

The mixing arrangement advantageously is able to gain more information out of the signals of the measurement arrangement than a counter. The first mixer output signal depends on a phase shift between a driver signal provided to the emitting ultrasonic transducer and a transducer signal generated by the receiving ultrasonic transducer. By the mixing arrangement, this phase shift can be determined with high accuracy. Thus, a flow rate can be measured with high precision depending on the phase shift.

In particular, the mixing arrangement comprises a first and a second mixer. The first and the second mixer each have a first input that is coupled to the first input of the mixing arrangement and a second input that is coupled to the second input of the mixing arrangement. A first mixer input signal is applied to the second input of the first mixer, whereas a second mixer input signal is applied to the second input of the second mixer. A frequency of the first and the second mixer input signal is equal. The frequency of the first and the second mixer input signal is equal to a driver frequency of the driver signal. The second mixer input signal has a phase shift to the first mixer input signal. The first and the second mixer each have an output. The first mixer output signal is provided at the output of the first mixer, whereas a second mixer output signal is tapped at the output of the second mixer. Due to the phase shift of the first mixer input signal to the second mixer input signal the first mixer output signal differs from the second mixer output signal. Thus, the second mixer output signal contains additional information in comparison to the first mixer output signal.

The averaging and dividing module is coupled on its input side to the output of the first mixer and to the output of the second mixer. The averaging and dividing module determines a first average value by averaging the first mixer output signal and a second average value by averaging the second mixer output signal. For instance, the first and the second average value correspond to the DC value of the first and the second mixer output signal. The averaging can be performed by a low pass, an integrator or a summation unit. Moreover, the averaging and dividing module is configured for dividing the second average value through the first average value and for providing a result of said division as a phase dependent signal. The result of the division of the second through the first average value corresponds to the tangent of a phase shift between the driver signal and the transducer signal. Alternatively, the averaging and dividing module divides the first average value through the second average value and provides the result of said division as a phase dependent signal.

In an embodiment, the phase shift between the first and the second mixer input signal is 90°. The first and the second mixer input signals are orthogonal to each other. The first mixer input signal can be a sine signal, whereas the second mixer input signal can be a cosine signal. Thus, a phase shift between 0° and 360° can unambiguously be calculated by means of the first and the second mixer output signal.

In an embodiment, the mixing arrangement comprises a signal generator. An input of the signal generator is connected to the clock generator via the second input of the mixing arrangement. The signal generator generates the first and the second mixer input signal. A first and a second output of the signal generator is coupled to the second input of the first mixer and to the second input of the second mixer for applying the first and the second mixer input signal to the first and the second mixer. The signal generator can be implemented as a quadrature generator. The signal generator may comprise a look-up table having the sine and cosine values of a number of angles.

In an embodiment, the measurement arrangement comprises a calculation module which is connected to an output of the averaging and dividing module. The calculation module calculates a phase signal from the phase dependent signal, i.e. result of the division of the first and the second average value. The phase signal corresponds to the phase shift between the driver signal and the transducer signal. By the calculation module the phase signal is determined for instance through applying the arctangent function to the result of the division of the second through the first average value. The quadrant of the phase angle may be determined by the signature of the first average value and the signature of the second average value. The averaging and dividing module provides the information about the signatures of the first and the second average value to the calculation module.

In an embodiment, the measurement arrangement comprises a signal evaluation module that is coupled to the output of the calculation module. The signal evaluation module is coupled on its input side to the output of the clock generator. The signal evaluation module determines the time-of-flight. Thus, the signal evaluation module determines the duration of the delay between the driver signal of the emitting ultrasonic transducer and the transducer signal of the receiving ultrasonic transducer. Said duration is equal to the time-of-flight.

The flow rate of a medium is calculated by the signal evaluation module depending on the time-of-flight.

In an embodiment, the clock generator comprises a phase locked loop, abbreviated PLL, and a reference clock. The reference clock is connected to an input of the PLL. An output of the PLL is coupled to the output of the clock generator. Thus, the clock generator generates a clock signal with a very stable frequency. By the PLL, a value of the clock frequency can be different from a value of frequency of the reference clock.

In an embodiment, the measurement arrangement comprises an analog-to-digital converter, abbreviated AD converter. An input of the AD converter is coupled to the receiving ultrasonic transducer. An output of the AD converter is coupled to the first input of the mixing arrangement. Thus, the mixing arrangement, the averaging and dividing module, the calculation module and the signal evaluation module are realized as digital modules.

In an embodiment, a digital signal processor, abbreviated DSP, comprises the AD converter, the signal generator, the mixing arrangement, the averaging and dividing module, the calculation module and the signal evaluation module. The digital signal processor on-line calculates the first and the second mixer output signal, the first and the second average value, the result of the division, the phase signal, the time-of-flight and the flow rate.

In an embodiment, the measurement arrangement comprises a frequency divider that is coupled on its input side to the output of the clock generator. An output of the frequency divider is coupled to the emitting ultrasonic transducer.

In an embodiment, the measurement arrangement comprises the emitting and the receiving ultrasonic transducer. The emitting ultrasonic transducer is coupled to the clock generator. The receiving ultrasonic transducer is coupled to the first input of the mixing arrangement.

In an embodiment, a measurement method comprises generating a clock signal and providing the clock signal or a driver signal derived from the clock signal to an emitting ultrasonic transducer. A transducer signal is generated by a receiving ultrasonic transducer. A first mixer input signal and a second mixer input signal are generated on the basis of the clock signal. A first and a second mixer output signal are generated by mixing the first respectively the second mixer input signal with the transducer signal or a signal derived from the transducer signal in each case. The method further comprises determining a first average value (AV1) by averaging the first mixer output signal (SO1), determining a second average value (AV2) by averaging the second mixer output signal (SO2), and generating a phase dependent signal by performing a division with the first average value (AV1) and the second average value (AV2).

Since both, the driver signal and the first mixer input signal, are derived from the clock signal, a very accurate measurement of a phase shift between the driver signal and the transducer signal can be performed. This results in a high accuracy of a time-of-flight that depends on the phase shift.

In an embodiment, the transducer signal depends on the driver signal and on a flow of a medium that is arranged between the emitting and the receiving ultrasonic transducer.

In an embodiment, the emitting ultrasonic transducer is driven with a burst that comprises a first number of cycles of the driver signal. The burst may consist of a first number of cycles of the driver signal. The driver signal has a driver frequency. The value of the driver frequency is designed such that the receiving ultrasonic transducer resonates at the driver frequency.

The following description of figures of exemplary embodiments may further illustrate and explain the invention. In so far as components, circuits or devices correspond to one another in terms of their function in different figures, the description thereof is not repeated for each of the following figures.

FIG. 2 shows an exemplary embodiment of a signal path in a measurement arrangement and FIG. 3 shows exemplary signals of a measurement arrangement.

Figure 1:
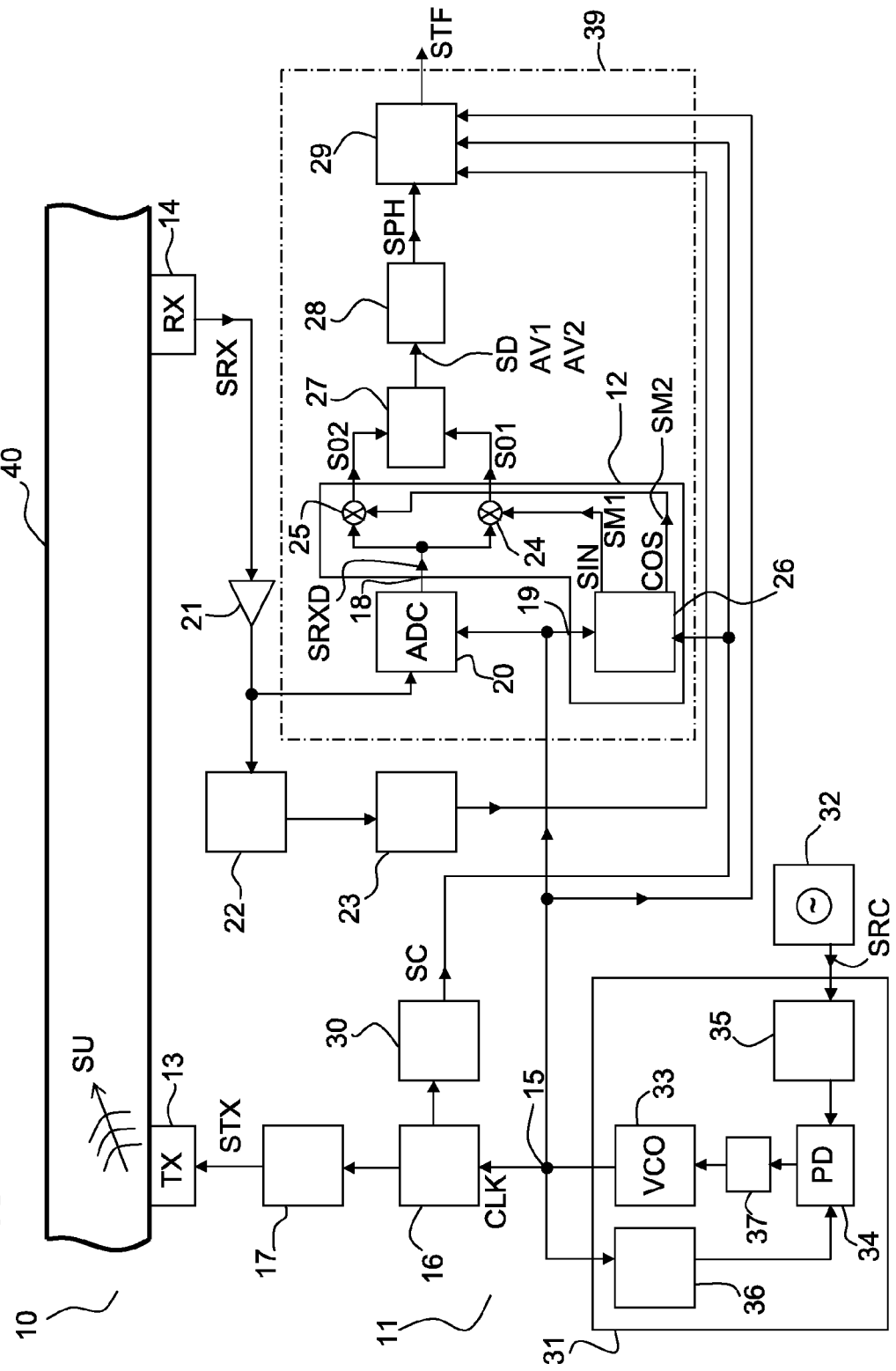
FIG. 1 shows an exemplary embodiment of a measurement arrangement.

FIG. 1 shows an exemplary embodiment of a measurement arrangement 10 in a block diagram. The measurement arrangement 10 comprises a clock generator 11 and a mixing arrangement 12. Furthermore, the measurement arrangement 10 comprises an emitting ultrasonic transducer 13 and a receiving ultrasonic transducer 14. An output 15 of the clock generator 11 is coupled to the emitting ultrasonic transducer 13. The measurement arrangement 10 comprises a frequency divider 16 that is arranged between the output 15 of the clock generator 11 and the emitting ultrasonic transducer 13. The measurement arrangement 10 comprises a driver 17 that couples the frequency divider 16 to the emitting ultrasonic transducer 13. The driver 17 can be realized as a pulse generator.

Furthermore, a first input 18 of the mixing arrangement 12 is coupled to the receiving ultrasonic transducer 14. The output 15 of the clock generator 11 is coupled to a second input 19 of the mixing arrangement 12. The measurement arrangement 10 comprises an analog-to-digital converter, abbreviated AD converter 20. The AD converter 20 is arranged between the receiving ultrasonic transducer 14 and the first input 18 of the mixing arrangement 12. A clock input of the AD converter 20 is connected to the output 15 of the clock generator 11. Moreover, the measurement arrangement 10 comprises an amplifier 21 that couples the receiving ultrasonic transducer 14 to the AD converter 20. A level detector 22 is also coupled to an output of the amplifier 21. A receiver control unit 23 is connected to an output of the level detector 22.

The mixing arrangement 12 comprises a first and a second mixer 24, 25. A first input of the first and the second mixer 24, 25 is connected to the first input 18 of the mixing arrangement 12. A second input of the first and the second mixer 24, 25 is coupled to the second input 19 of the mixing arrangement 12. The mixing arrangement 12 comprises a signal generator 26 having a first input that is connected to the second input 19 of the mixing arrangement 12. A first output of the signal generator 26 is connected to the second input of the first mixer 24. Similarly, a second output of the signal generator 26 is connected to the second input of the second mixer 25. Moreover, the measurement arrangement 10 comprises an averaging and dividing module 27 having a first input that is coupled to an output of the first mixer 24 and having a second input that is coupled to an output of the second mixer 25. The averaging and dividing module 27 is coupled on its output side to a calculation module 28 of the measurement arrangement 10. An output of the calculation module 28 is coupled to an input of a signal evaluation module 29 of the measurement arrangement 10. The receiver control unit 23 is coupled on its output side to the signal evaluation module 29. The output 15 of the clock generator 11 is connected to another input of the signal evaluation module 29.

Moreover, the measurement arrangement 10 comprises a pulse counter 30. The pulse counter 30 may be realized as a transmitter pulse counter. The pulse counter 30 couples the frequency divider 16 to a further input of the signal generator 26. Moreover, the pulse counter 30 couples the frequency divider 16 to a further input of the signal evaluation module 29. The frequency divider 16 has a first and a second output. The first output of the frequency divider 16 is coupled via the driver 17 to the emitting ultrasonic transducer 13. The second output of the frequency divider 16 is coupled via the pulse counter 30 to the further input of the signal generator 26 and to the signal evaluation module 29.

The clock generator 11 comprises a phase locked loop circuit 31, abbreviated PLL, and a reference clock 32. The reference clock 32 may be implemented as a low jitter reference clock. The reference clock 32 may be realized as a quartz oscillator. The reference clock 32 is coupled via the PLL 31 to the output 15 of the clock generator 11. The PLL 31 comprises a voltage controlled oscillator 33, a phase detector 34 and a first loop divider 35. The phase detector 34 is coupled via the voltage controlled oscillator 33 to the output 15 of the clock generator 11. The reference clock 32 is coupled via the first loop divider 35 to a first input of the phase detector 34. The output 15 of the clock generator 11 is coupled to a second input of the phase detector 34. Moreover, a second loop divider 36 of the PLL 31 couples the output 15 of the clock generator 11 to the second input of the phase detector 34. Furthermore, the PLL 31 comprises a loop filter 37 that is arranged between the phase detector 34 and the voltage controlled oscillator 33.

The measurement arrangement 10 for instance comprises a pipe 40. A medium such as a gas or a liquid flows in the pipe 40. The emitting ultrasonic transducer 13 and the receiving ultrasonic transducer 14 are arranged at the wall of the pipe 40.

A digital signal processor 39, abbreviated DSP, may comprise the AD converter 20, the signal generator 26, the mixing arrangement 12, the averaging and dividing module 27, the calculation module 28 and the signal evaluation module 29.

The clock generator 11 generates a clock signal CLK at the output 15 of the clock generator 11. The clock signal CLK preferably is a digital signal. The clock signal CLK has a clock frequency fc. The clock signal CLK is provided to the frequency divider 16 that generates a signal with a driver frequency f0. The signal of the frequency divider 16 is amplified by the driver 17 and provided as a driver signal STX to the emitting ultrasonic transducer 13. The driver frequency of the driver signal STX has the value f0. The driver signal STX obtains only two voltage values.

The emitting ultrasonic transducer 13 is excited by the driver signal STX and generates an ultrasonic signal SU in the form of ultrasonic waves that is transmitted to the receiving ultrasonic transducer 14. The ultrasonic signal SU causes a transducer signal SRX at the receiving ultrasonic transducer 14. The transducer signal SRX is amplified by the amplifier 21 and provided to the AD converter 20. The sinusoidal waveform output from the receiving ultrasonic transducer 14 is digitized by the AD converter 20 and is fed into the DSP 39. The AD converter 20 converts the transducer signal SRX into a digital transducer signal SRXD. The transducer signal SRX has a form of a sine signal. The driver signal STX and the transducer signal SRX can be calculated according to the following equations:

$$STX = \text{sgn}(\sin(\omega_0 t)) \text{ with } \omega_0 = 2\pi f_0,$$

$$SRX = k(t) \cdot \sin(\omega_0 t + \theta_d),$$

Wherein k(t) is a coupling factor and $\theta_d$ is a phase shift due to the time-of-flight. The coupling factor k(t) is described as a time varying amplitude of the response of the receiving ultrasonic transducer 14. The digital transducer signal SRXD is provided to the first input 18 of the mixing arrangement 12 and, therefore, to the first input of the first and the second mixer 24, 25.

The clock signal CLK is provided to the clock input of the AD converter 20 and to the first input of the signal generator 26 via the second input 19 of the mixing arrangement 12. The signal generator 26 provides sine and cosine values that are provided to the second input of the first and the second mixer 24, 25. The signal generator 26 can be implemented as a look-up table. Due to the coupling of the output 15 of the clock generator 11 to the emitting ultrasonic transducer 13 and to the signal generator 26, a phase difference of the values of the first mixer input signal SM1 to the driver STX is constant and also a phase of the second mixer input signal SM2 to the driver signal STX is constant.

The signal generator 26 provides the first mixer input signal SM1 at the first output and the second mixer input signal SM2 at the second output. For example, the phase difference between the driver signal STX and the first mixer input signal SM1 is zero and the phase difference between the driver signal STX and the second mixer input signal SM2 is more or less exactly 90°. The received transducer signal SRX has a shape similar to the signal shown in FIG. 3. By using a pair of look-up tables driven from the clock signal CLK and taking as a phase reference the excitation frequency that is the driver frequency f0, a sine value and a cosine value at the driver frequency f0 are generated. These quadrature signals SM1, SM2 are then multiplied with the received transducer signal SRX.

The first mixer 24 generates a first mixer output signal SO1 by mixing of the first mixer input signal SM1 and the digital transducer signal SRXD. Similarly, the second mixer 25 generates a second mixer output signal SO2 by mixing of the second mixer input signal SM2 and the digital transducer signal SRXD according to the following equations:

$$SM1 = \sin(\omega_0 t),$$

$$SM2 = \cos(\omega_0 t),$$

$$SO1 = SM1 * SRXD = \sin(\omega_0 t) * k(t)\sin(\omega_0 t) = \frac{k(t)}{2}[\cos\theta_d - \cos(2\omega_0 t + \theta_d)],$$

$$SO2 = SM2 * SRXD = \cos(\omega_0 t) * k(t)\sin(\omega_0 t) = \frac{k(t)}{2}[\sin\theta_d + \sin(2\omega_0 t + \theta_d)],$$

The mixing produces double frequency components which have a DC offset proportional to the sine or cosine of the phase shift $\theta_d$ and proportional to the coupling factor k(t). The coupling factor k(t) is dependant on the envelope and offset of the received waveform. The first and the second mixer output signal SO1, SO2 are provided to the first and the second input of the averaging and dividing module 27. By summing or averaging each of the two waveforms with respect to a whole period duration 1/f0 of the driver frequency f0, the double frequency data is removed. The averaging and dividing module 27 generates a first average value AV1 by averaging the first mixer output signal SO1 and a second average value AV2 by averaging the second mixer output signal SO2. Furthermore, the averaging and dividing module 27 performs a division with the first average value AV1 and the second average value AV2 and provides the result of the division SD to the calculation module 28.

The calculation module 28 generates a phase signal SPH depending on the result of the division SD. The phase signal SPH represents the phase shift $\theta_d$ that can be calculated by the arctangent function out of the result of the division SD provided by the averaging and dividing module 27. The phase signal SPH is provided to the signal evaluation module 29. The first and the second average AV1, AV2, the result of the division SD and the phase signal SPH can be calculated according to the equations:

$$AV1 = g\frac{k(t)}{2}\cos\theta_d,$$

$$AV2 = g\frac{k(t)}{2}\sin\theta_d,$$

$$SD = AV2/AV1 = \sin\theta_d/\cos\theta_d = \tan\theta_d,$$

$$SPH = \arctan(SD) = \theta_d$$

Wherein g is a constant introduced into both equations for the first and the second average value AV1, AV2 and is determined by the number of periods of the driver frequency f0 and the exact method used to sum or average the data. By dividing the sine term by the cosine term, the common factors such as g and k(t) are cancelled and the tangent SD of the phase shift $\theta_d$ remains. By applying the arctangent to the result of the division SD, the fractional phase delay angle $\theta_d$ is determined.

The pulse counter 30 counts pulses of a signal provided at the second output of the frequency divider 16. The pulse counter 30 generates a pulse counter signal SC that is provided to the signal generator 26 and to the signal evaluation module 29. The pulse counter signal SC is designed for triggering the signal generator 26 such that the phase of the first mixer input signal SM1 corresponds to the phase of the driver signal STX. The transducer signal SRX is provided via the amplifier 21 to the level detector 22 which discriminates noise generated at the output of the amplifier 21 from values of the transducer signal SRX that are caused by an ultrasonic propagation of waves in the pipe 40.

The duration of the delay of the transducer signal SRX to the driver signal STX can be more than one duration of a cycle of the driver signals STX. The duration of one cycle is 1/f0. The signal evaluation module 29 determines how many durations of a cycle of the driver signal STX are obtained by the duration of the delay between the transducer signal SRX and the driver signal STX. This information is calculated using information provided by the receiver control unit 23 and the pulse counter signal SC. The signal evaluation module 29 provides a time-of-flight signal STF. The time-of-flight signal STF is calculated by means of the phase signal SPH and the number N of cycles which are obtained in the delay between the transducer signal SRX and the driver signal STX:

$$STF = \frac{N}{f0} + \theta_d$$

Adding the fractional delay that is the phase shift $\theta_d$ to the delay time of the number of whole cycles of the driver signals STX at the driver frequency f0 gives the time-of-flight signal STF. The time-of-flight signal STF is determined on-line by the DSP 39. A calibration, dependent on a particular installation, may optionally be performed to assess the correct baseline for the whole cycle f0 to be included in the time-of-flight calculation.

The reference clock 32 generates a reference clock signal SRC that stabilizes the clock signal CLK. The driver frequency f0 of the driver signal STX and the clock frequency fc of the clock signal CLK can be calculated according to the following equations:

$$fc = fs\frac{N2}{N1},$$

$$f0 = fc/ND,$$

Wherein fs is a frequency value of the reference clock signal SRC, N1 is a divider ratio of the first loop divider 35, N2 is a divider ratio of the second loop divider 36 and ND is a divider ratio of the frequency divider 16. The low jitter reference clock 32 and the PLL 31 are used to generate the clock signal CLK. The receiving ultrasonic transducer 14 has a resonate characteristic. The clock signal CLK is divided down to a lower driver frequency f0 which is selected to be near or at the resonant frequency of the receiving ultrasonic transducer 14 which will be used to receive the ultrasonic signal SU. The signal at the driver frequency f0 is used to excite the transmitting ultrasonic transducer 13 to generate the ultrasonic signal SU. Additionally, the counter 30 is driven by the driver frequency f0 and is used to count the number of excitation pulses applied to the emitting ultrasonic transducer 13.

The time-of-flight flow rate measurement makes use of the change in time taken for the ultrasonic signal SU to get from the emitting ultrasonic transducer 13 to the receiving ultrasonic transducer 14 due to the flow within the pipe 40. The higher the flow rate the more the time-of-flight, abbreviated TOF, will deviate away from the nominal value without flow.

The time-of-flight ultrasonic flow metering uses burst or impulse excitation of the emitting ultrasonic transducer 13 to generate a packet of energy which causes the receiving ultrasonic transducer 14 to resonate or ring. A burst consists of several cycles of a square wave. Due to the mixing arrangement 12, more than a single property of the received energy, such as a peak level, zero crossing point et cetera, is used to measure the time-of-flight. Thus, the effect of noise on a single property is cancelled. The burst excitation of the emitting ultrasonic transducer 13 causes the receiving ultrasonic transducer 14 to resonate. The waveform SRX provided by the receiving ultrasonic transducer 14 is then compared to an ideal sinusoid locked, by means of the PLL 31, at the same driver frequency f0 as the emitting ultrasonic transducer 13.

The multiplication with the reference cosine and sine signals SM1, SM2, generated by the PLL 31, allows the phase shift $\theta_d$ of the received sinusoid to be obtained. The phase shift $\theta_d$ of the sinusoid gives the time-of-flight of the ultrasonic signal SU. Thus, the received waveform is mixed separately with a sine and cosine wave generated from the same reference clock as the emitting ultrasonic transducer 13 and in phase with the emitting ultrasonic transducer 13. This mixing produces double frequency sinusoidal waves with DC offsets related to the phase shift $\theta_d$ caused by the time-of-flight between the transmitter that is the emitting ultrasonic transducer 13 and the receiver that is the receiving ultrasonic transducer 14. By averaging each waveform and then dividing one into the other the tangent of the phase shift angle tan $\theta_d$, and subsequently, the value of the phase shift angle $\theta_d$ can be obtained. Combining this phase shift angle $\theta_d$ with a count of the whole cycles of the transmit frequency f0 produces the time-of-flight signal STF.

Advantageously, a burst excitation of a square wave of the transmitter 13 is required rather than a continuous excitation. All the information in the received waveform is used rather than just a single sample improving the resolution of the measurement. This in turn will result in less activation cycles of the transmitter 13 to achieve the required measurement accuracy. The digital signal processing required to implement the method has a low effort.

As both the transmitted and received signals STX, SRX are derived from the same clock generator 11, the time-of-flight signal STF is immune to variations due to process drift. Using the sine and cosine signals followed by a tangent/arctangent direct conversion technique, the phase shift $\theta_d$ due to time-of-flight from a burst excitation is measured. The method exploits the resonant nature of the receiving ultrasonic transducer 14.

The measurement arrangement 10 may have the following advantages:

A high noise rejection is obtained: Using the entire sinusoid of the received transducer signal SRX rather than just a zero cross increases noise immunity by rejecting all noise not within the bandwidth of the PLL 31 used to generate the reference sinusoid SM1.

The method results in a high resolution for the determination of the time-of-flight. More than one data per cycle is used. The action of the DSP 39 uses all the data per cycle to improve single cycle resolution.

The measurement arrangement 10 has a high power efficiency: The transmitter and receive circuits can be active for a much shorter time to achieve a high time-of-flight resolution because a much higher resolution is achieved per cycle of the transmitted signal.

The arrangement 10 has a high system stability: As the receiver 14 tracks the transmitter 13 using a PLL, variations in the system due to a component drift, a temperature effect, aging et cetera are tracked and high accuracy can be maintained without the need for additional periodic calibrations.

A resonance calibration can optionally be performed. The use of the PLL 31 to lock the reference sinusoid SM1 to the transmitted signal SRX allows the measurement arrangement 10 to be easily calibrated for the peak resonance of the receiving ultrasonic transducer 14. This improves the gain of the receiving ultrasonic transducer 14 which further improves noise rejection and power efficiency.

High solution flexibility is achieved. The final resolution of the time-of-flight signal STF is dependent on the digital implementation and can easily be changed to suit a variety of system requirements.

In an alternative, not shown embodiment, the frequency divider 16 comprises only one output. The output of the frequency divider 16 is connected to the emitting ultrasonic transducer 13 via the driver 17 as well as to the second input of the signal generator 26 and to the signal evaluation module 29 via the pulse counter 30.

In an alternative embodiment, the clock signal CLK and the driver signal STX are analog signals such as sine signals.

FIG. 2 shows an exemplary embodiment of a signal path in the measurement arrangement 10 that is a further development of the measurement arrangement shown in FIG. 1. The emitting ultrasonic transducer 13 generates the ultrasonic signal SU that propagates in the medium inside of the pipe 40. The medium can be a fluid or a gas. The ultrasonic signal SU propagates in zigzag form to the receiving ultrasonic transducer 40. The flow of the medium is in the direction from the emitting ultrasonic transducer 13 to the receiving ultrasonic transducer 14.

Alternatively, the flow is in the direction from the receiving ultrasonic transducer 14 to the emitting ultrasonic transducer 13.

FIG. 3 shows exemplary embodiments of signals of the measurement arrangement 10. In FIG. 3, a transmitted series of pulses is shown producing a resonant response on the receiving ultrasonic transducer 14. The number of pulses is three in this example. The driver signal STX and the transducer signal SRX are shown depending on a time t. While the driver signal STX has a rectangular form, the transducer signal SRX nearly obtains a sine form. In the example, the delay between the transducer signal SRX and the driver signal STX that is the time-of-flight signal STF is about a complete duration of a cycle of the driver signal STX and a quarter of a duration of the cycle of the driver signal STX.

The invention claimed is:

1. A measurement arrangement with a clock generator for generating a clock signal, with a driver that is configured to generate a driver signal having a driver frequency based on the clock signal and to provide the driver signal to an emitting ultrasonic transducer, with an averaging and dividing module and with a mixing arrangement that comprises:
   a first input, which is configured to be coupled to a receiving ultrasonic transducer;
   a second input which is coupled to the clock generator;
   a first mixer having
      a first input that is connected to the first input of the mixing arrangement,
      a second input that is coupled to the second input of the mixing arrangement for receiving a first mixer input signal that has a frequency corresponding to the driver frequency, and
      an output for providing a first mixer output signal;
   a second mixer having
      a first input that is connected to the first input of the mixing arrangement,
      a second input that is coupled to the second input of the mixing arrangement for receiving a second mixer input signal that has a phase shift relative to the first mixer input signal and a frequency equal to the frequency of the first mixer input signal, and
      an output for providing a second mixer output signal,
   wherein the averaging and dividing module is coupled on its input side to the output of the first mixer and to the output of the second mixer and is configured
      to determine a first average value by averaging the first mixer output signal,
      to determine a second average value by averaging the second mixer output signal, and
      to generate a phase dependent signal by performing a division with the first average value and the second average value.

2. The measurement arrangement according to claim 1, wherein the phase shift between the first and the second mixer input signal is basically 90 degrees.

3. The measurement arrangement according to claim 1 or 2, the mixing arrangement comprising a signal generator having
   an input coupled to the second input of the mixing arrangement,
   a first output coupled to the second input of the first mixer for providing the first mixer input signal, and
   a second output coupled to the second input of the second mixer for providing the second mixer input signal.

4. The measurement arrangement according to claim 1, further comprising a calculation module that is coupled to an output of the averaging and dividing module and is configured for calculating a phase signal on the basis of the phase dependent signal.

5. The measurement arrangement according to claim 4, further comprising a signal evaluation module that is configured to generate a time-of-flight signal on the basis of the phase signal and on a counted number of clock cycles of the driver signal.

6. The measurement arrangement according to claim 5, further comprising a pulse counter coupled to the clock generator for providing the counted number of clock cycles of the driver signal.

7. The measurement arrangement according to claim 1, the clock generator comprising:
   a phase locked loop having an output coupled to an output of the clock generator; and
   a reference clock generator coupled to an input of the phase locked loop.

8. The measurement arrangement according to claim 1, further comprising an analog-to-digital converter having
   an input for being coupled to the receiving ultrasonic transducer, and
   an output that is coupled to the first input of the mixing arrangement.

9. The measurement arrangement according to claim 1, further comprising a frequency divider having
   an input coupled to the clock generator and
   an output coupled to the driver.

10. The measurement arrangement according to claim 1, further comprising:
   the emitting ultrasonic transducer coupled to the driver; and
   the receiving ultrasonic transducer coupled to the first input of the mixing arrangement.

11. A measurement method, comprising:
   generating a clock signal;
   providing a driver signal derived from the clock signal to an emitting ultrasonic transducer;
   generating a transducer signal by a receiving ultrasonic transducer;
   generating a first mixer input signal based on the clock signal;
   generating a second mixer input signal based on the clock signal, wherein the second mixer input signal has a phase shift to the first mixer input signal and a frequency equal to the frequency of the first mixer input signal;
   generating a first mixer output signal by mixing the first mixer input signal with the transducer signal or a signal derived from the transducer signal;
   generating a second mixer output signal by mixing the second mixer input signal with the transducer signal or a signal derived from the transducer signal;
   determining a first average value by averaging the first mixer output signal;
   determining a second average value by averaging the second mixer output signal; and
   generating a phase dependent signal by performing a division with the first average value and the second average value.

12. The method according to claim 11, wherein the phase dependent signal is generated by dividing the second average value through the first average value.

13. The method according to claim 11 or 12, wherein a phase signal is calculated on the basis of the phase dependent signal.

14. The method according to claim 13, wherein a time-of-flight signal is generated depending on the phase signal.

15. The method according to claim 14, wherein the time-of-flight signal is generated on the basis of the phase signal and on a counted number of clock cycles of the driver signal.

16. The method according to claim 11, wherein the emitting ultrasonic transducer is driven with a burst comprising a first number of cycles of the driver signal having a driver frequency that causes the receiving ultrasonic transducer to resonate.

* * * * *